United States Patent
Köstner et al.

(10) Patent No.: US 8,031,592 B2
(45) Date of Patent: Oct. 4, 2011

(54) NETWORK HAVING REDUNDANCY PROPERTIES, ETHERNET SWITCH FOR SUCH A NETWORK AND METHOD FOR CONFIGURING SUCH A NETWORK

(75) Inventors: Michael Köstner, Kandel (DE); Joachim Lohmeyer, Hilpoltstein (DE); Harald Thrum, Stutensee (DE)

(73) Assignee: Siemens Aktiengesellschaft, Munich (DE)

( * ) Notice: Subject to any disclaimer, the term of this patent is extended or adjusted under 35 U.S.C. 154(b) by 431 days.

(21) Appl. No.: 12/085,544

(22) PCT Filed: Nov. 27, 2006

(86) PCT No.: PCT/EP2006/068940
§ 371 (c)(1),
(2), (4) Date: May 27, 2008

(87) PCT Pub. No.: WO2007/063045
PCT Pub. Date: Jun. 7, 2007

(65) Prior Publication Data
US 2009/0274068 A1    Nov. 5, 2009

(30) Foreign Application Priority Data
Nov. 30, 2005   (DE) .......................... 10 2005 057 122

(51) Int. Cl.
*H04J 1/16* (2006.01)
(52) U.S. Cl. ..................... 370/228; 370/225; 370/227
(58) Field of Classification Search .............. 370/218, 370/328, 225, 227, 228
See application file for complete search history.

(56) References Cited

U.S. PATENT DOCUMENTS

| | | | |
|---|---|---|---|
| 5,537,532 A | 7/1996 | Chng et al. | |
| 6,173,411 B1 * | 1/2001 | Hirst et al. | 714/4.3 |
| 6,895,024 B1 * | 5/2005 | Drake et al. | 370/536 |
| 6,981,174 B1 * | 12/2005 | Hanning | 714/5 |
| 2002/0147800 A1 * | 10/2002 | Gai et al. | 709/221 |
| 2003/0055900 A1 * | 3/2003 | Glas et al. | 709/205 |
| 2004/0165525 A1 | 8/2004 | Burak | |
| 2005/0271044 A1 | 12/2005 | Hsu et al. | |
| 2005/0281191 A1 | 12/2005 | McGee et al. | |
| 2006/0106968 A1 | 5/2006 | Wooi Teoh | |

FOREIGN PATENT DOCUMENTS

| | | |
|---|---|---|
| CN | 1665198 A | 9/2005 |
| EP | 0 403 763 A2 | 12/1990 |
| EP | 0 560 122 A2 | 9/1993 |
| EP | 1113363 * | 12/2000 |
| EP | 1 260 081 B1 | 11/2002 |

* cited by examiner

Primary Examiner — Ricky Ngo
Assistant Examiner — Dewanda Samuel

(57) ABSTRACT

There is described a network having redundancy properties, an Ethernet switch, and a method for configuring the network. At least two network segments which are formed with a plurality of Ethernet switches are connected to one another by means of a redundant connection comprising at least two coupling channels. During configuration, a programming device stores a logic name for the redundant connection in the respective memory of associated coupling devices. In a network startup phase, said coupling devices determine the respective other connection partner associated with the same redundant connection by distributing special messages in which they enter the logic name of the redundant connection. They use an order criterion to determine which coupling channel is active and which coupling channel is deactivated during trouble-free operation.

11 Claims, 3 Drawing Sheets

NETWORK HAVING REDUNDANCY PROPERTIES, ETHERNET SWITCH FOR SUCH A NETWORK AND METHOD FOR CONFIGURING SUCH A NETWORK

CROSS REFERENCE TO RELATED APPLICATIONS

This application is the US National Stage of International Application No. PCT/EP2006/068940, filed Nov. 27, 2006 and claims the benefit thereof. The International Application claims the benefits of German application No. 10 2005 057 122.0 DE filed Nov. 30, 2005, both of the applications are incorporated by reference herein in their entirety.

FIELD OF INVENTION

The invention relates to a network having redundancy properties, wherein said network conforms to an Ethernet specification and contains at least two network segments which are formed using a plurality of Ethernet switches and are connected to each other via a redundant connection comprising at least two coupling channels, to an Ethernet switch for such a network and to a method for configuring such a network.

BACKGROUND OF INVENTION

Various networks having redundancy properties are already disclosed in EP 1 260 081 B1. Inter alia a so-called Optical Switch Module (OSM) having a plurality of ports for the attachment of further network components is described there. In order to construct an Ethernet or Fast Ethernet network, e.g. terminals are attached to the ports and are therefore connected to each other via the OSM. A plurality of OSMs can be interconnected in a continuous line structure to form a string. An optical ring is produced if the two line ends are attached to an Optical Redundancy Manager (ORM). Test messages which the ORM inputs into the two line ends are used to check whether there is an interruption in the string. If there is no error, i.e. if the string is not interrupted, the ORM separates the two line ends and if there is an error, the two line ends are connected together by the ORM. In a network comprising a plurality of redundant optical rings, two optical rings are coupled together via two OSMs. The two OSMs which are connected between the optical rings form a communication channel in each case, of which one is active and one is switched to a standby mode. The two OSMs exchange their status via special standby ports which are connected to each other by means of cables. If the connection via the active OSM fails, the redundant OSM enables its communication channel, i.e. it switches from standby mode to active mode. A comparatively short reconfiguration time is achieved in this way. This prevents physical errors, temporary electromagnetic interference, network upgrades or component replacements from impairing the communication between the network components for an unacceptably long time. The disadvantage in this case is that two additional devices are required for the redundant connection of two optical rings, and that these devices must additionally be connected together. In order to avoid this disadvantage, the above cited patent document proposes that a switch module which is located at the active communication channel cyclically sends so-called port-select messages to the other switch modules that are arranged in the same string, while the communication channel is uninterrupted. The switch module which is located in standby mode at the other communication channel monitors the first communication channel by analyzing the port-select messages. Although a comparatively short reconfiguration time is likewise achieved in the known network, the configuration of the switch modules in the startup phase of the network is disadvantageously carried out using a resource-intensive algorithm and requires more time due to the multiplicity of messages that must be sent.

Further networks having redundancy management are disclosed in the publications EP-A-0 403 763 and EP-A-0 560 122.

The standardized Spanning Tree and Rapid Spanning Tree protocols likewise allow redundancy management in an Ethernet network. However, these methods cannot always be used in industrial communications due to the long reconfiguration times, particularly if time intervals of several seconds during which the data communication is disrupted are not acceptable.

SUMMARY OF INVENTION

An object of the invention is to provide a network having redundancy properties and an Ethernet switch for such a network, which can be configured easily and in a manner which requires few resources during a network startup phase.

This object is achieved by the new network having redundancy properties, the new Ethernet switch and the new method for configuring such a network, these having the features cited in the independent claims respectively.

The invention has the advantage that it allows a particularly simple configuration of redundant connections between segments of an Ethernet network in which Ethernet switches are arranged. In a particularly clear manner, the configuration merely requires a user to enter or specify a logical name of the redundant connection. This can be freely chosen and is designated as a connection name. Two Ethernet switches are configured as a device pair in a network segment. This device pair monitors itself during redundancy operation in accordance with the configuration in a reciprocal manner using Ethernet messages and, in the event of an error, reroutes the data traffic from one Ethernet connection to the other (redundant) connection in each case. If a coupling port in the Ethernet switch is also configured for each redundant connection, port-selective switching between the Ethernet switches that are involved in a redundant connection is advantageously possible.

An Ethernet switch in whose memory a logical name for a second or further redundant connection can be stored has the advantage that the further redundant connections can be configured in the same way as the first redundant connection was configured and that each redundant connection has its own redundancy for link-down events. If a link-down occurs at a coupling port, i.e. if the redundancy is lost for a coupling channel, this actually has no effect on the redundancy of the other redundant connections, since the redundancy can be switched in a port-selective manner.

By virtue of a specially defined multicast address which is used as a destination address in the special messages, the transmission range of the special messages in the Ethernet network can advantageously be restricted, e.g. to switches which are capable of setting up a redundant connection. In this case, a particularly simple defining criterion for determining which coupling channel is active in error-free operation and which has been deactivated is established if the MAC source address which is received in the special messages is analyzed and compared with the local MAC address in the Ethernet switches that are involved in a redundant connection. For example, the Ethernet switch which has the highest MAC address can be defined by default setting as the master, which then provides the active coupling channel in error-free operation. Alternatively, the defining criterion can be configurable for this purpose, e.g. by assigning numeric values to the switches.

BRIEF DESCRIPTION OF THE DRAWINGS

The invention and configurations and advantages thereof are explained in greater detail below with reference to the drawings, in which an exemplary embodiment of the invention is illustrated and in which.

DETAILED DESCRIPTION OF INVENTION

Figure 1:
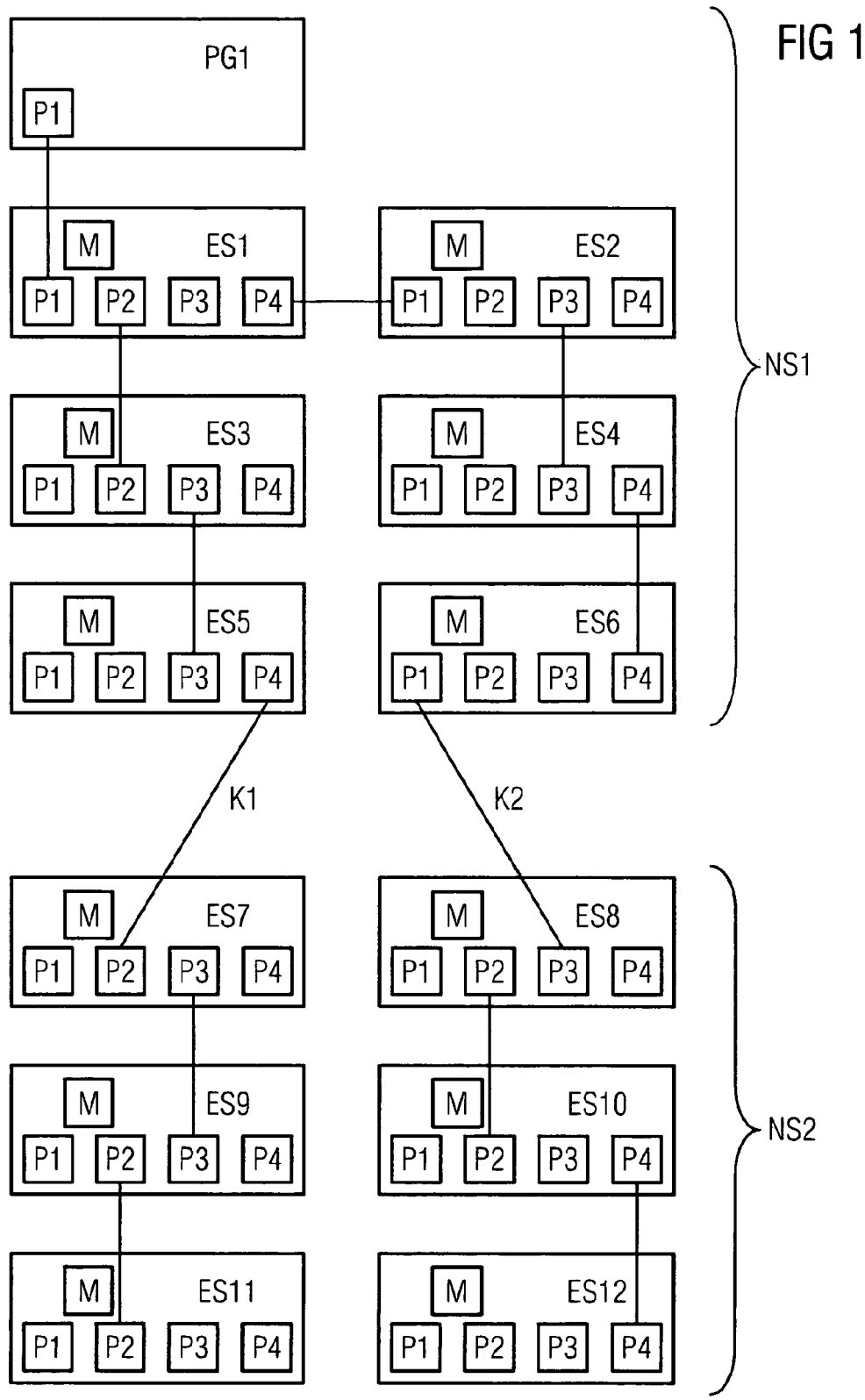
FIG. 1 shows a network having redundancy properties.

In accordance with FIG. 1, an exemplary network having redundancy properties consists of two network segments NS1 and NS2, each of which contains six Ethernet switches ES1 . . . ES6 and ES7 . . . ES12 respectively. The switches feature in each case a memory M for storing configuration data and ports P1 . . . P4 for coupling to other Ethernet switches or terminal subscribers. It is obvious that switches having a different number of ports can be installed as an alternative. For the purpose of data transmission between two Ethernet switches, a port of one of the switches is connected to a port of the other switch in each case. For example, the port P3 of the Ethernet switch ES2 is attached to the port P3 of the Ethernet switch ES4. Two coupling channels K1 and K2 form a redundant connection between the two network segments NS1 and NS2. The first coupling channel K1 is formed by a connection of the port P4 of the Ethernet switch ES5, which is arranged in the network segment NS1, to the port P2 of the Ethernet switch ES7, which is arranged in the network segment NS2. A connection of the port P1 of the Ethernet switch ES6 in the network segment NS1 to the port P3 of the Ethernet switch ES8 in the network segment NS2 provides the second coupling channel K2 of the redundant connection. A programming device PG1, which is attached via a port P1 to the port P1 of the Ethernet switch ES1, is used for configuring the network on the basis of suitable inputs from a user. For this purpose, the programming device PG1 has suitable operating elements, such as e.g. a display unit and a keyboard, which are not illustrated in the figure for the sake of clarity. The configuration can take place e.g. with the aid of a web page which is loaded into the programming device PG1 from a switch that is to be configured, or with the aid of a configuration tool, e.g. an SNMP (Simple Network Management Protocol) tool which runs on the programming device PG1 as a program. As part of the configuration, a logical name which designates the redundant connection between the two network segments NS1 and NS2 is entered into the relevant memory M of the Ethernet switches ES5 and ES6. The coupling port which is used for the redundant connection is also stored in the relevant memory M. This is the port P4 in the case of the Ethernet switch ES5, and the port P1 in the case of the Ethernet switch ES6. In a network startup phase, the two Ethernet switches ES5 and ES6 ascertain, by means of distributing special messages in which they enter the logical name of the redundant connection, the respective other Ethernet switch ES6 or ES5 belonging to the same redundant connection. With reference to a defining criterion, e.g. on the basis of the local MAC address in the network, the two Ethernet switches ES5 and ES6 establish which coupling channel is active during error-free operation and which is deactivated. For the purpose of redundancy monitoring during the redundancy operation, e.g. the Ethernet switch ES6, which has the highest MAC address in the network, is assigned the function of a master while the Ethernet switch ES5 having the lower MAC address is operated as a slave. In cyclically transmitted unicast messages, the master notifies the slave of the status of its coupling port. If the Ethernet switch ES6 sends "link-up" as the status of the coupling port P1, the coupling port P4 of the Ethernet switch ES5 remains deactivated. However, if the Ethernet switch ES6 sends "link-down" as the status or if the Ethernet switch ES5 does not receive any more such messages for longer than a predetermined period, it recognizes the failure of the coupling channel of the partner device, in this case of the Ethernet switch ES6, and activates its coupling port P4. Therefore during error-free operation, i.e. if the coupling port P1 of the Ethernet switch ES6 has the status link-up, only the coupling port P1 of the Ethernet switch ES6 is active as master. If the coupling port P1 of the master changes to the status link-down, the coupling port P4 of the Ethernet switch ES5 belonging to the same redundant connection is activated. The cycle time used for sending the messages from the master depends on the required reconfiguration time of the network. In the case of a maximal reconfiguration time of approximately 100 ms, a cycle time of e.g. 10 ms is preferred, since the network experiences only a limited additional load from the cyclically sent messages in this case.

Figure 2:
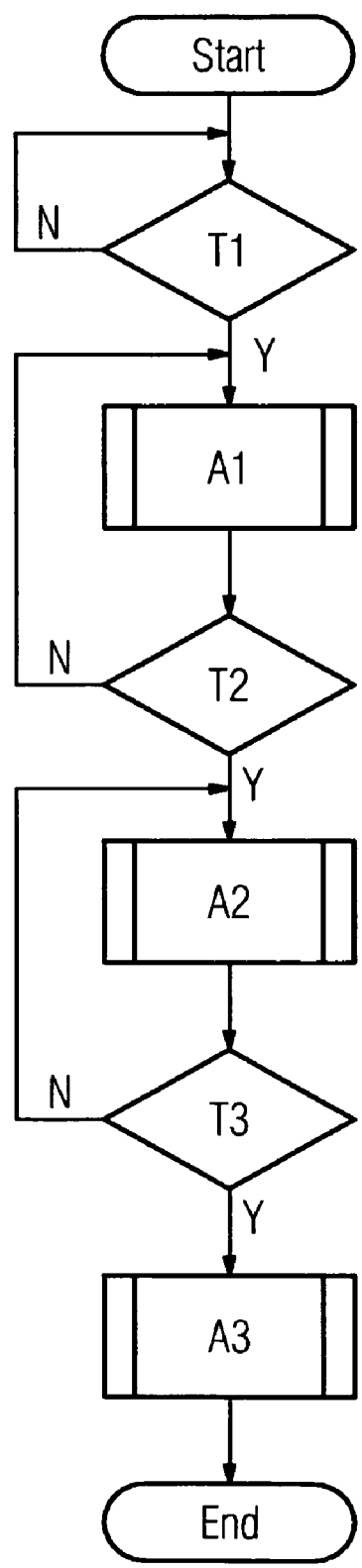
FIG. 2 shows a flow diagram of the redundancy configuration.

The configuration of the network during the network startup phase is described in greater detail below with reference to the flow diagram in FIG. 2. The method begins at the Start. In a branch T1, the Ethernet switch checks whether a logical name for the redundant connection, e.g. the name "Network2", which name is the same for all Ethernet switches of the same redundant connection, has already been entered in the relevant memory M (FIG. 1). As soon as a connection name is entered at the Ethernet switch, said switch changes to a status of "no connection" corresponding to an action A1. In this status, the Ethernet switch functions as follows:

The Ethernet switch cyclically sends multicast messages comprising a MAC multicast address which is specially defined for the method as a destination address, the unique MAC unicast address of the relevant Ethernet switch as a source address, and the logical connection name which was assigned to the relevant redundant connection. The coupling port associated with the redundant connection remains deactivated.

As soon as the Ethernet switch which has the status "no connection" receives a valid message containing the above cited defined MAC multicast address, it compares the connection name contained therein with that which is stored in the local memory M. If the comparison produces a match, the Ethernet switch changes to a status "connection established" corresponding to a path Y following a branch T2 in which the comparison took place. Such a receive message can only be the message of the redundant partner device. The respective other Ethernet switch associated with the same redundant connection is therefore identified.

In an action A2, the Ethernet switch now cyclically sends unicast messages to the partner device that has been identified. These unicast messages contain the unique MAC unicast address of the partner device as a destination address, the unique MAC—unicast address of the Ethernet switch which processes the execution of the method as a source address, and the link status of the defined coupling port. In a branch T3 following thereupon, the Ethernet switch checks whether corresponding messages having the MAC unicast address of the partner device as a source address are received. If this is the case, action A3 takes place. In the context of the action A3, the Ethernet switch establishes the distribution of master/slave roles. This takes place in accordance with a defining criterion. For example, the Ethernet switch having the highest MAC unicast address is master. If the Ethernet switch itself becomes master, it sends the status of its specified coupling port to the slave. Depending on the status that is received, the slave activates or deactivates its coupling port. If the status "link-down" for the coupling port of the master is received in a message, the coupling port of the slave becomes or remains activated. Conversely, if the status "link-up" is read from the message, the coupling port of the slave becomes or remains deactivated. This procedure is applied analogously during the redundancy operation which follows "End" in the flow diagram.

As soon as a slave which has the status "connection established" does not receive any more messages from the master, it activates the coupling port and changes to the status "no connection". As a result of this, the redundancy can advantageously be automatically reconfigured following the reintroduction of a partner device of a redundant connection.

For diagnostic purposes, the monitoring of the slave can also take place with the aid of cyclic messages from the slave which are analyzed by the master.

On the basis of the routine which is shown, it is clear that the method can manage the redundant coupling of physical and virtual network segments, and of network segments in which wireless transmission sections are combined with wire-based transmission sections.

Figure 3:
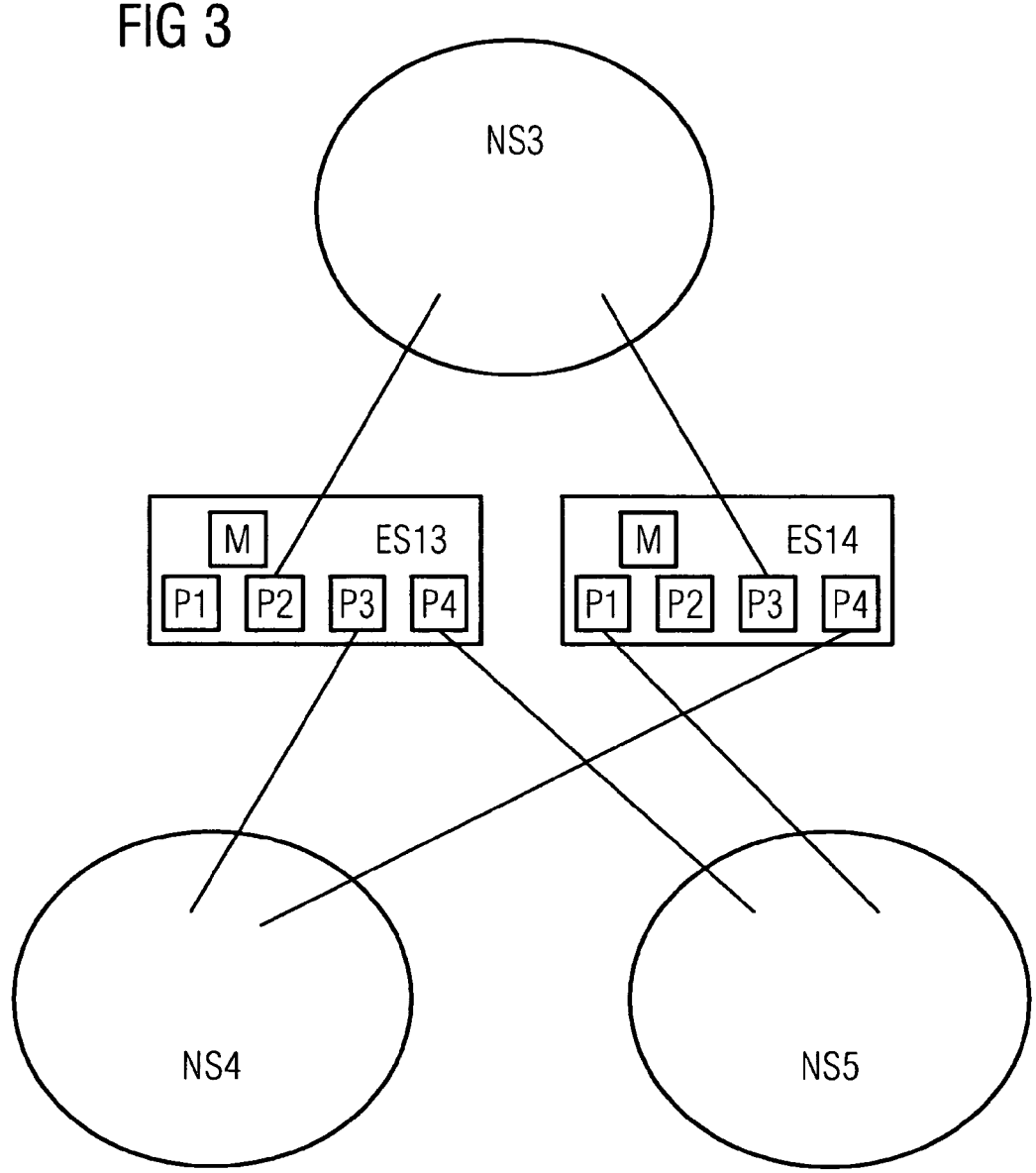
FIG. 3 shows a network comprising three network segments.

In the exemplary embodiment shown in FIG. 3, three network segments NS3, NS4 and NS5 are redundantly coupled via two Ethernet switches ES13 and ES14. For the purpose of the redundancy configuration, both a logical name e.g. "Network4" and a logical name e.g. "Network5" are entered in the respective memories M of the Ethernet switches ES13 and ES14 for the redundant connection between the network segment NS3 and the network segment NS4 or between the network segment NS3 and the network segment NS5 respectively. In this case, the coupling port P3 in the Ethernet switch ES13 and the coupling port P4 in the Ethernet switch ES14 are assigned to the redundant connection "Network4". The redundant connection "Network5" is correspondingly assigned the coupling port P4 of the Ethernet switch ES13 and the coupling port P1 of the Ethernet switch ES14. For each redundant connection, the configuration method runs in the manner described with reference to the FIGS. 1 and 2. If a link-down occurs in relation to a coupling port, e.g. the coupling port P3, and therefore the redundancy is lost for the redundant connection "Network4", this has no effect on the redundancy of the other redundant connection "Network5". The method therefore allows port-selective switching between master and slave, i.e. each redundant connection has its own redundancy for link-down events.

The invention claimed is:

1. A network having redundancy properties, wherein the network complies with an Ethernet specification, comprising:
at least two network segments which have a plurality of Ethernet switches, wherein the at least two network segments are connected to each other via a redundant connection comprising at least two coupling channels, wherein
a first coupling channel has a connection of a first port of a first Ethernet switch which is arranged in the first network segment to a second port of a second Ethernet switch which is arranged in the second network segment, and wherein
a second coupling channel has a connection of a third port of a third Ethernet switch which is arranged in the first network segment to a fourth port of a fourth Ethernet switch which is arranged in the second network segment; and
a programming device to store a logical name for the redundant connection in the first and the third Ethernet switch during the configuration of the network, wherein the first or third port are specified as a coupling port, wherein the first and the third Ethernet switches identify, during a network startup phase, the respective other third or first Ethernet switch belonging to the same redundant connection by distributing special messages in which the switches enter the logical name of the redundant connection, and wherein the first and third Ethernet switch determines based upon a defining criterion which coupling channel is active during an error-free operation and which is deactivated.

2. An Ethernet switch for use as a first Ethernet switch in a network having redundancy properties, comprising:
a memory for the first Ethernet switch wherein the first Ethernet switch stores a logical name for a redundant connection of the network in the memory, wherein a first port is specified as a coupling port, wherein the first Ethernet switch sends, in a network startup phase, special messages in which it enters the logical name of the redundant connection and its MAC address, wherein the network has at least two network segments which have a plurality of Ethernet switches, wherein the at least two network segments are connected to each other via a redundant connection comprising at least two coupling channels, wherein
a first coupling channel has a connection of the first port of the first Ethernet switch which is arranged in the first network segment to a second port of a second Ethernet switch which is arranged in the second network segment, and wherein
a second coupling channel has a connection of a third port of a third Ethernet switch which is arranged in the first network segment to a fourth port of a fourth Ethernet switch which is arranged in the second network segment, wherein when the first Ethernet switch receives a corresponding special message from the third Ethernet switch the first Ethernet switch identifies the third Ethernet switch as belonging to the same redundant connection, and wherein the first Ethernet switch determines based upon a defining criterion which coupling channel is active during an error-free operation and which is deactivated.

3. The Ethernet switch as claimed in claim 2, wherein the logical names for a second or further redundant connections are stored in the memory.

4. The Ethernet switch as claimed in claim 2, wherein the logical names for a second and further redundant connections are stored in the memory.

5. The Ethernet switch as claimed in claim 2, wherein the special messages are multicast messages, wherein the Ethernet switch compares the logical name of a redundant connection contained in the special message with its own stored logical name, when the special message is received, and wherein in the event of a match the MAC source address contained in the message and the local MAC address is analyzed as a defining criterion.

6. The Ethernet switch as claimed in claim 3, wherein the special messages are multicast messages, wherein the Ethernet switch compares the logical name of a redundant connection contained in the special message with its own stored logical name, when the special message is received, and wherein in the event of a match the MAC source address contained in the message and the local MAC address is analyzed as a defining criterion.

7. The Ethernet switch as claimed in claim 4, wherein the special messages are multicast messages, wherein the Ethernet switch compares the logical name of a redundant connection contained in the special message with its own stored logical name, when the special message is received, and wherein in the event of a match the MAC source address contained in the message and the local MAC address is analyzed as a defining criterion.

8. A method for configuring a network having redundancy properties, comprising:
   providing a network having at least two network segments which have a plurality of Ethernet switches, wherein the at least two network segments are connected to each other via a redundant connection comprising at least two coupling channels, wherein
      a first coupling channel connects a first port of a first Ethernet switch in the first network segment to a second port of a second Ethernet switch in the second network segment, and wherein
      a second coupling channel connects a third port of a third Ethernet switch in the first network segment to a fourth port of a fourth Ethernet switch in the second network segment; and
   storing a logical name for the redundant connection in the first and the third Ethernet switch using a programming device during a configuration of the network, wherein the first and the third Ethernet switches identify, during a network startup phase, the respective other third or first Ethernet switch belonging to the same redundant connection by distributing special messages in which the switches enter the logical name of the redundant connection, wherein the first and third Ethernet switch determines based upon a defining criterion which coupling channel is active during an error-free operation and which is deactivated.

9. The network as claimed in claim 1, configured to:
   designate the first or third Ethernet connected to the active coupling channel switch as a master;
   designate the respective other third or first Ethernet switch connected to the deactivated coupling channel as a slave;
   cyclically transmit a unicast message from the master that notifies the slave of the status of the coupling channel connected to the master; and
   if the slave receives a "link down" status from the master, or if the slave does not receive a status from the master for a predetermined period of time, the slave recognizes a failure of the coupling channel connected to the master, and activates the deactivated coupling channel connected to the slave.

10. The Ethernet switch as claimed in claim 2, configured to:
    cyclically transmit a unicast message that notifies the third Ethernet switch of the status of the first coupling channel.

11. The method as claimed in claim 8, further comprising:
    designating the first or third Ethernet switch connected to the active coupling channel as a master;
    designating the respective other third or first Ethernet switch connected to the deactivated coupling channel as a slave;
    the master cyclically transmitting a unicast message that notifies the slave of the status of the coupling channel connected to the master; and
    if the slave receives a "link down" status from the master, or if the slave does not receive a status from the master for a predetermined period of time, the slave recognizes a failure of the coupling channel connected to the master, and activates the deactivated coupling channel connected to the slave.

* * * * *